United States Patent [19]

Mercurio et al.

[11] 4,186,831
[45] Feb. 5, 1980

[54] CONNECTOR FOR CATENARY CONVEYOR BELT IDLER ROLLS

[75] Inventors: Richard N. Mercurio; Richard B. Graham, both of Columbus, Ohio

[73] Assignee: Dresser Industries, Inc., Dallas, Tex.

[21] Appl. No.: 831,326

[22] Filed: Sep. 7, 1977

[51] Int. Cl.² .............. B65G 45/02; B65G 15/60
[52] U.S. Cl. ................. 198/501; 198/827; 403/58; 403/395
[58] Field of Search ............ 198/500, 501, 826, 827, 198/852; 74/245 R, 245 C, 245 LP, 250 R, 250 C; 403/58, 395; 308/20, 187

[56] References Cited

U.S. PATENT DOCUMENTS

| 1,893,141 | 1/1933 | Kampfer | 198/852 |
| 3,110,394 | 11/1963 | Lo Presti | 198/827 |
| 3,246,736 | 4/1966 | Lo Presti | 198/827 |
| 3,960,243 | 6/1976 | Di Antonio | 198/501 |

FOREIGN PATENT DOCUMENTS

| 1481308 | 2/1969 | Fed. Rep. of Germany | 198/827 |
| 70166 | 2/1959 | France | 403/395 |
| 1399527 | 11/1965 | France | 198/827 |

Primary Examiner—Joseph E. Valenza
Attorney, Agent, or Firm—Paul E. Krieger

[57] ABSTRACT

The invention is a unique connector for joining the juxtaposed ends of the shafts of two adjacent conveyor idler rolls. The shaft ends are provided with diametrically extending pivots. The connecting link comprises a continuous or endless loop of relatively rigid high strength material folded over to form two pairs of spaced but parallel gudgeons, each pair of gudgeons forming a clevis. One clevis loopingly or pivotably engages the pivots attached to one idler shaft, and the other clevis similarly engages the perpendicularly aligned pivots attached to the other shaft. In one embodiment, a trunnion nut having colinearly extending pivot stubs and a threaded central opening, is screwed onto the end of each shaft. Optionally, a flexible grease tube can be passed from one shaft end through the connector to the other shaft end to provide flow-through lubrication capability.

6 Claims, 10 Drawing Figures

CONNECTOR FOR CATENARY CONVEYOR BELT IDLER ROLLS

The present invention relates to an improved connector for joining conveyor idler rolls such that one has substantially universal pivotal freedom with respect to the other, and more specifically, to a connector particularly well suited for joining the shaft ends of catenary idler rolls.

Long, endless belt conveyors are used in a variety of applications to carry loose bulk materials. The catenary belt conveyor is so-called because the belt-supporting idlers are strung end-to-end so they hang between two end supports in a nearly natural arc or catenary. The end supports may be either rigid or flexible as in the case of rope or cable supported conveyors.

Catenary idlers can be grouped into one of two types. In the first, usually found in light duty applications, the idler rolls are fixed to their shafts and all rotate together as a unit on bearings located on both ends of the string. In one example of this type the idler rolls are mounted on a continuous flexible cable which forms the shaft for the assembly. In other designs, the individual roller shafts are connected together by universal joints. In the second type of catenary idler, usually more suitable for higher capacity applications, the idler rolls rotate around non-rotating shafts. It is in conjunction with this type of catenary idler system that the present invention will be hereinafter discussed, although its potential for use in the first type and in other applications should be recognized.

Catenary conveyors are well recognized as having several important advantages over those with rigid frame idlers. This is particularly so in the case of extra long conveyors and shiftable belt conveyors such as are often found in open pit mines and the like. Catenary idlers eliminate or reduce belt tracking problems even under irregular loading conditions. Their superior tracking properties are particularly important for shiftable belt conveyors where the alignment between support frames cannot be closely maintained without substantial effort. Catenary idlers convert the applied weight or load on the belt conveyor into tension which is transferred through their supporting shaft or shafts to the end supports. Since the forces resulting from the load on the belt are evenly distributed throughout the string of idlers there is less wear on the bearings and other components. Catenary idlers can better withstand high impact loads, since the shock of such loads is absorbed by displacement or movement of the rolls. Finally, unlike rigid frame idlers, a catenary idler string with a failed component can be dropped out of service while the conveyor belt is still running. Other features and advantages of catenary idlers are well known, but no further attempt is made to mention them all here.

The foregoing features depend considerably upon a suitable connector between the separate idlers. The connectors must allow the idlers to pivot freely so the string can change curvature according to the load on the conveyor belt. The connectors must also allow the idler string to move or drift some in the downstream direction of the conveyor in order to absorb the shock of high impact or surge loads. And, in the case of the stationary shaft idlers, the connector should be effective to prevent undesired rotation of the shaft of an interior idler.

A variety of connectors have been used to join the shafts of catenary idlers, but none without at least some of the following drawbacks. Firstly, some of the prior art connectors permit pivotable movement between the idlers only in one plane; normally the plane common to their axes. This, of course, does not allow the idler string to flex in the downstream direction.

Secondly, other connectors permit more universal motion between the joined idlers, but prevent or restrict flow-through lubrication for the idler assembly. Flow-through lubrication, which is common with rigid frame idlers, is accomplished by using hollow shafts and flexible tubes connecting the adjacent ends of those shafts so that a lubricant, such as grease, can be transmitted from one roll to the other. This allows the entire assembly to be lubricated from one application point, usually adjacent an end support. Such flow-through lubrication is not feasible with many of the existing connectors because they block the passage between the shafts. For example, several of the prior art connectors use pins passed diametrically through the end of the roller shaft. Thirdly, many of the prior art connectors cause an undesirable large space between the adjacent idler rolls. Some belt conveyor operators consider this a serious problem and especially so where light-weight belts are used. The belts either get pinched in the gaps between the idler rolls or develop longitudinal splits from riding on the edge of a roll.

Finally, high manufacturing cost and difficulty in assembly are also problems common to many of these prior art connectors.

Therefore, it is the principle object of the present invention to provide an improved connector for joining the adjacent shafts of catenary idler rolls which eliminates the aforementioned disadvantages inherent in the prior art connectors.

It is a more specific object to provide a connector which permits flow-through lubrication with catenary-type idlers.

It is another specific object to provide a connector for catenary idlers which allows greater pivotal freedom between the connected rolls, and yet which prevents undesirable relative rotation between the adjacent shafts.

Finally, it is an object to provide a connector for catenary idlers having the foregoing characteristics, which has adequate strength and wearability, which can be used with standard idler rolls, which can be economically manufactured, and which can be easily assembled and installed.

These and other objects are met by the present invention as embodied in a unique connecting link which engages radially extending pivot means attached to the end of each of the adjacent roll shafts. The connecting link is a continuous rod or bar uniquely shaped in the form of a closed loop folded over to create two pairs of U-shaped gudgeons. The gudgeons of each pair lie in spaced parallel planes and form a clevis which is perpendicular to the clevis of the other pair. One clevis loopingly engages the pivot means on one idler roll shaft, and the other clevis loopingly engages the pivot means on the other idler shaft and which is oriented perpendicular to the first pivot means.

With this arrangement the connecting link can pivot about one shaft along one axis and about the other shaft on an axis perpendicular to the first. By various combinations of these movements the connector allows virtually universal pivotal freedom between the connected shafts.

In one embodiment, the pivot means is a trunnion nut having a pair of diametrically opposed lobes or pivots. The trunnion nuts can be attached to the respective shafts in several ways, but in the embodiment shown, the central opening is threaded such that the nut can be screwed onto the end of the idler shaft. Since the entire central area of the connecting link is open, a flexible grease tube can extend from one shaft through the nuts and connecting links to the other shaft, thus allowing flow-through lubrication. The grease tube is flexible and provided with fittings at each end which allow it to be installed with the connector in place.

Some longitudinal space is provided between the two pairs of gudgeons in the connecting link. This allows easy assembly of the connection by placing the trunnion nuts in position and screwing or otherwise locking the idler shafts into them. When both trunnion nuts are threaded tightly to their shafts, the connecting link is captured in place.

The foregoing characteristics and features, as well as others, will be readily apparent from the more detailed description of the invention which follows with reference to the accompanying drawings, which form part of this specification, and of which:

Figure 1:
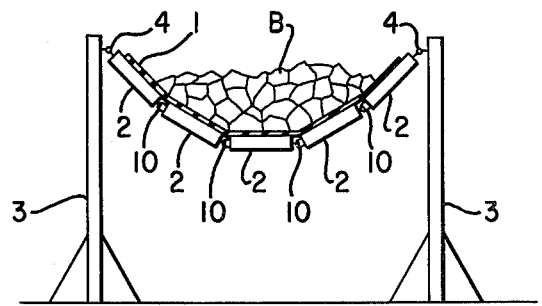
FIG. 1 is an elevational view in cross-section through a typical catenary-type belt conveyor for handling bulk material and illustrates one application of the present invention.

The belt conveyor 1 of FIG. 1 is supported by a string of idler rolls 2 hung end-to-end from end supports or a conveyor frame 3 such that they form nearly a natural curve or catenary. The number of rolls in a string will vary, but three to seven idler rolls seem most popular for loaded strands. The catenary string of idlers shape the belt 1 into a trough for better containment of the loose bulk material or burden B. The end idlers may be connected to the conveyor frame 3 by quick release connectors 4, several types of which are well known in the art.

Figure 2:
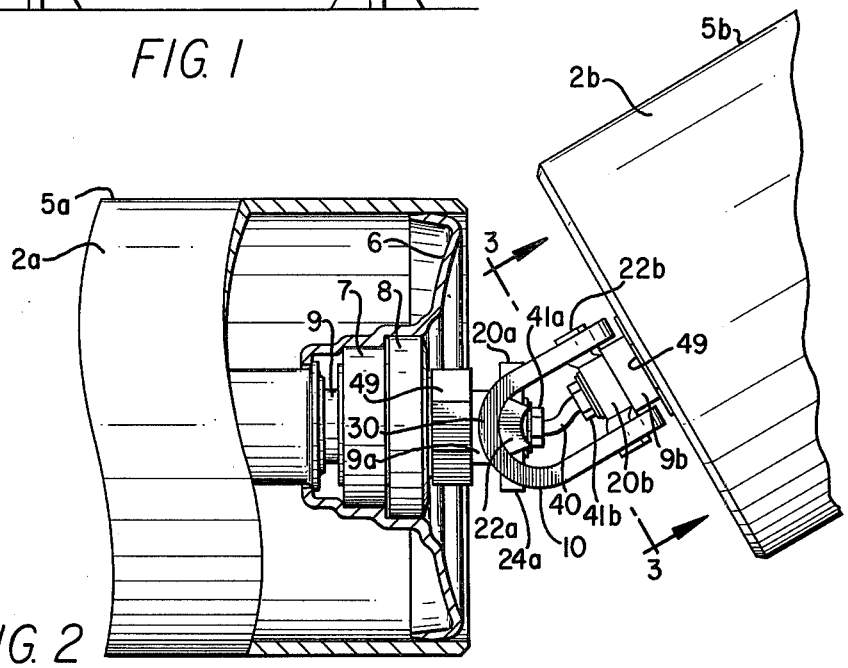
FIG. 2 is an enlarged view of the juxtaposed ends of two adjacent idler rolls from FIG. 1 showing a connecting link and connection embodying the present invention.
Figure 3:
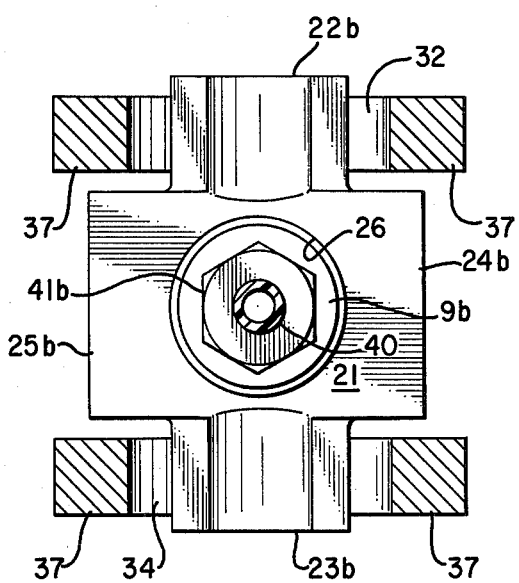
FIG. 3 is a cross-sectional view through the connection of FIG. 2 as taken along the line 3—3 in FIG. 2.

However, the idler rolls 2 are connected to each other by connections 10, one of which is functionally shown more clearly in the enlarged FIG. 2. In this and the remaining figures, 2a will designate one idler roll, 2b an adjacent idler roll, and the letters (a) and (b) will be used with other reference numerals, to designate identical parts associated respectively with idlers 2a and 2b. The typical idler roll, such as 2a, consists of an outer cylindrical shell 5 with formed metal ends 6. The end stamping 6 is configured to snugly engage a bearing 7 and a rotary lubricant seal 8. The bearings 7 are in turn mounted on the idler shaft 9 about which the cylindrical shell 5 freely rotates. The bearing 7 and seal 8 are held in place by an adjusting nut or collar 49.

Figure 4:
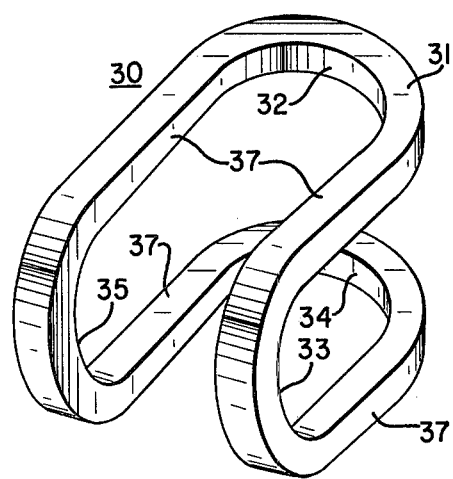
FIG. 4 is a view in perspective of the unique connecting link used to connect the idlers in FIG. 2.
Figure 5:
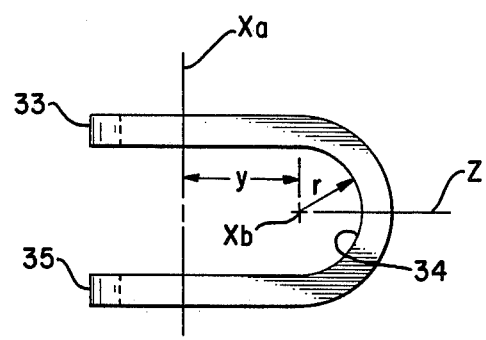
FIG. 5 is a side elevation view of the connecting link of FIG. 4.
Figure 6:
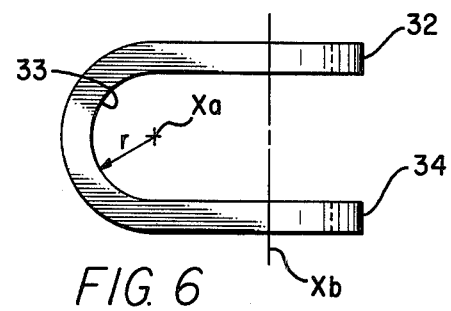
FIG. 6 is a top view of the connecting link of FIG. 4.
Figure 7:
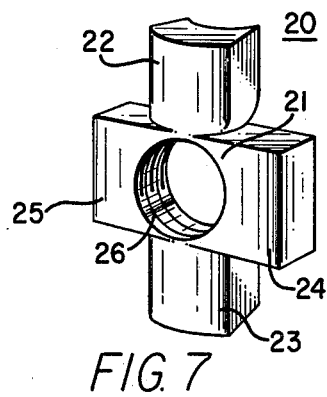
FIG. 7 is a view in perspective of the trunnion nut used with the connecting link of FIG. 4 in the connection shown in FIG. 2.
Figure 8:
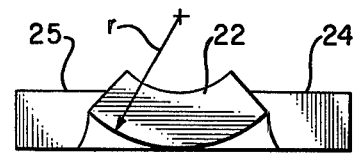
FIG. 8 is a top view of the trunnion nut of FIG. 7.
Figure 9:
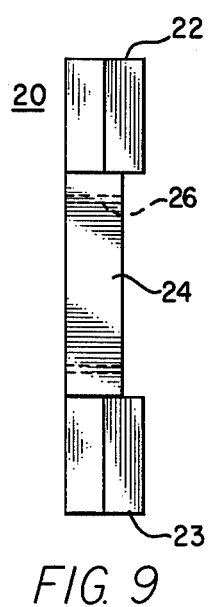
FIG. 9 is a side elevation view of the trunnion nut of FIG. 7.

The connection 10 includes a member having two radially extending appendages or pivots, such as the trunnion nut 20 shown in FIGS. 7-9, attached to each of the idler shafts 9a and 9b. The pivots of the trunnion nuts 20a and 20b are pivotably engaged by the unique connecting link 30 shown in FIGS. 4-6. Where flow-through lubrication from one idler to the other is desired, a flexible lubricant tube 40 is connected between the ends of the shafts 9a and 9b by fittings 41a and 41b, as shown more clearly in FIG. 10.

The connecting link 30 comprises a slender bar or rod 31 of high tensile strength, resilient material, such as steel. The rod is formed into an endless loop. Although the rod shown here has a square cross section, other generally symmetrical cross-sectional shapes, such as round with flattened bearing surfaces, may be better suited to particular applications. The endless loop is bent or folded into the shape shown in FIG. 4 such that it forms four U-shaped gudgeons designated as 32, 33, 34, and 35, respectively. The gudgeons are joined together by the straight sections or legs 37. Preferably the curved or bearing portion of each gudgeon has a uniform radius r.

One pair of gudgeons 32 and 34 lie in planes parallel to but spaced from each other and form a clevis with axis Xa. Similarly, the gudgeons 33 and 35 lie in spaced parallel planes and form a clevis with axis Xb. However, the planes of the gudgeons 33 and 35 are perpendicular to the planes of gudgeons 32 and 34.

For purposes of discussion, the axis Xa represents an imaginary line projected through the theoretical centers of the U-shaped gudgeons 32 and 34. Similarly, the axis Xb represents an imaginary line through the centers of the U-shaped gudgeons 33 and 35. It will be noted that the axis Xa and Xb are not only perpendicular to each other, but are also spaced apart a distance Y which depends on the length of the legs 37.

The trunnion nut 20 is preferably of a stiff and high strength material such as heat treated steel. The trunnion nut has a central body, indicated generally at 21, and two diametrically aligned, but oppositely extending appendages or pivots 22 and 23. The pivots engage and bear against the curved portion of the clevises of the connecting link, and therefore the working surface of the pivots 22 and 23 is also preferably rounded to approximately the same radius r as the gudgeons.

Although other means of attaching the trunnion nut to an idler shaft are conceivable, in the embodiment shown, the body 21 of the nut has a central threaded hole 26 adapted to match an external threaded portion of the shaft end. Additional lateral appendages or wings 24 and 25 are provided as one means to prevent the nut moving out of place in the connecting link as will be discussed later. Although the dimensions of the wings 24 and 25 are not as critical as the pivots 22 and 23, their combined length must be greater than the inner diameter of the appropriate pair of gudgeons. On the other hand, the pivots 22 and 23 must together be longer than the space between the same pair of gudgeons and preferably extend slightly beyond said pair. The width of the pivots 22 and 23 should largely be determined by the anticipated maximum angular relationship between the idler rolls, but they should be wide enough to always overlap the theoretical centerline, indicated as Z in FIG. 5, of the clevis against which they work even when the idlers are in the maximum pivot position.

To assemble the connection 10 of FIG. 2, the two trunnion nuts 20a and 20b are placed back to back with their respective pivots at right angles and inserted into an open end of the connecting link. The trunnion nuts are then rotated into position with the pivots 22a and 23a against the gudgeons 33 and 35, respectively, and the pivots 22b and 23b against gudgeons 32 and 34, respectively. Idler shaft 9a is then screwed into the threaded opening 26a of trunnion nut 20a. Similarly, idler shaft 9b is screwed into the threaded opening of trunnion nut 20b. Because the wings 24 and 25 of both trunnion nuts prevent the nuts from sliding out of the connecting link along the respective clevis axis, the connecting link is now captured but freely movable between the idler rolls 2a and 2b.

When the idlers 2a and 2b are hung in a catenary string as shown in FIG. 1, the trunnion nuts 20a and 20b will be pulled apart to bear firmly against the clevises of the connecting link 30. During operation, the load B on the conveyor keeps the trunnion nuts 20 snug against the connector 30. The connecting link can move in one plane about the pivots of trunnion nut 20 on the former's theoretical axis Xa. And because the link 30 can also pivot in a perpendicular plane about the pivots of trunnion nut 20b on the axis Xb, various combinations of movement in those two planes make the connection 10 capable of substantially universal pivotal motion. Thus forces due to the load B on the conveyor are readily transferred into tensile forces along the axis of the idler shafts to the conveyor frame 3.

Because the forces of the connecting link are in tension, as long as the pivots 22 and 23 of the trunnion nuts are rigid, the shape of the connecting link is completely stable with an optimum distribution of stresses. Thus, the unique shape of the connecting link 30 makes it feasible to use the weakest material or smallest cross section of the rod 31 consistent with the load to be supported.

The space Y between the clevis axes Xa and Xb of the link need only be large enough to allow insertion and positioning of the two trunnion nuts. Because of this, the connection 10 requires minimal space between the idler shafts 9a and 9b and therefore the gap between the corresponding idler shells 5a and 5b can be minimized.

Figure 10:
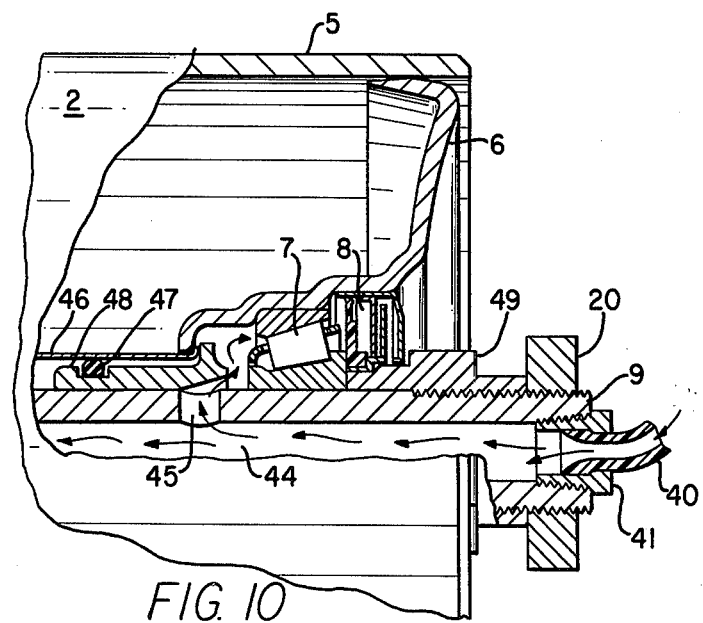
FIG. 10 is an enlarged view, partly in cross section, of the end of one of the idler rolls of FIG. 2.

It is another important feature of the connecting link 30 that its entire central area is open and unobstructed in the direction parallel to its legs 37. Therefore, the connection 10 permits flow-through lubrication from idler to idler. Referring to FIGS. 2 and 10, the grease tube 40, preferably of rubber, plastic, or other flexible material, connects the openings 44 in the adjacent hollow idler shafts 9a and 9b. The tube is connected by the fittings 41a and 41b which screw into the respective idler shafts. The ends of the tube 40 are flared so that the pressure of the lubricant forces a tight seal of the tube against the interior of the fitting. However, during installation the fitting 41 can be rotated with respect to the tube 40, and therefore the tube can be connected to the adjacent idler shafts even with the connecting link 30 in place.

Lubricant, such as grease, flowing through the tube 40 enters the opening 44 and either passes along to other bearing areas or idler shafts or flows through the hole 45 in the shaft 9 to reach the immediate bearing 7. The idler roll 2 is also provided with a cylindrical inner liner 46 extending from one roll end 6 to the other. An O-ring 47 seated in a collar 48 mounted on the shaft 9 seals against the liner 46. This seal and the rotary seal 8 contain the lubricant in the bearing area.

Although in the preferred form of the invention described above and shown in the drawings the connecting link is used with trunnion nuts 20, it should be recognized that the link could be used in cooperation with other pivot means attached to the idler shaft. For example the shaft collar 49 could be provided with radially extending appendages which are engaged by the connecting link 30. For another example, the link 30 could engage the extensions of a pin passing diametrically through the end of the shaft 9, but such an arrangement would not have all the advantages of the preferred embodiment.

Finally, a feature of both the connecting link 30 and the trunnion nuts 20 that should not be overlooked is that they can both be readily manufactured by well-known techniques.

The embodiments of the invention in which an exclusive property or privilege is claimed are defined as follows:

1. A pivotal connection for adjacent shafts comprising:
    (a) a pair of shafts disposed so that an end of one shaft is juxtapositioned relative to an end of the other shaft;
    (b) an idler roller mounted for rotation about each shaft;
    (c) pivot means including a pair of oppositely extending, aligned pivots rigidly connected to the juxtapositioned end of each shaft, the pivots on one shaft being oriented 90° relative to the pivots on the other shaft and projecting radially relative to its respective shaft, the side of each pivot facing its respective shaft having a curved surface; and
    (d) a connecting link for connecting the shafts through the pivots including an endless loop formed of two pairs of U-shaped sections, each pair being connected to each other through the other pair, the sections in each pair being located in parallel planes and perpendicular to the sections in the other pair, the inner surface of each section cooperating with and engaging a pivot and being shaped to conform to the curved surface of its cooperating pivot, so that each shaft can pivot in one plane through relative movement of the pivot curved surfaces and connecting link inner surfaces, the shafts together pivoting in perpendicular planes relative to each other, the pivot means includes a central body and a pair of pivots, projecting colinearly from opposite sides of the central body, the central body includes a pair of appendages extending perpendicular to the pivots, the distance between the distal ends of the appendages being greater than the width of the cooperating pair of U-shaped sections such that the central body cannot slide free from the connecting link in the direction parallel to a line through the radial centers of the pair of sections.

2. The connection of claim 1, wherein the connecting link has a uniform cross-section along its entire length.

3. The connection of claim 2, wherein the connecting link has a square cross-section.

4. The connection of claim 1, wherein each central body and cooperating shaft include mating threads.

5. The connection of claim 1, wherein each central body includes a central opening adapted to accommodate a flexible lubricant conduit extending between the shafts.

6. The connection of claim 1, wherein the curved surfaces are convex.

* * * * *